United States Patent [19]

Buchanan

[11] Patent Number: 4,940,355

[45] Date of Patent: Jul. 10, 1990

[54] QUICK INSTALL AND RELEASE FASTENING SYSTEM

[75] Inventor: Jeffery J. Buchanan, Lexington, Ky.

[73] Assignee: Square D Company, Palatine, Ill.

[21] Appl. No.: 384,605

[22] Filed: Jul. 19, 1989

[51] Int. Cl.[5] .............................................. F16B 21/07

[52] U.S. Cl. ........................................ 403/24; 24/663; 403/406.1; 411/452; 411/510; 411/553

[58] Field of Search ......................... 24/590, 591, 663; 411/508–510, 553, 550, 549, 349, 452, 455, 456, 437, 432–434; 292/251; 403/24, 405.1, 406.1, 407.1

[56] References Cited

U.S. PATENT DOCUMENTS

| | | | |
|---|---|---|---|
| 2,252,286 | 8/1941 | Hathorn | 411/349 |
| 2,476,506 | 7/1949 | Olsen | 411/456 X |
| 2,552,805 | 5/1951 | Murphy | 411/549 |
| 2,641,814 | 6/1953 | Hartman | 411/549 |
| 2,741,938 | 4/1956 | Johnson | 411/510 X |
| 3,080,633 | 3/1963 | Reddy | 24/591 |
| 3,123,389 | 3/1964 | Biesecker | 411/549 X |
| 3,718,950 | 3/1973 | Engstrom | 24/663 X |
| 3,741,594 | 6/1973 | Ostling | 403/407.1 |
| 4,580,322 | 4/1986 | Wright et al. | 24/663 X |

FOREIGN PATENT DOCUMENTS

| | | | |
|---|---|---|---|
| 0115671 | 8/1984 | European Pat. Off. | 411/437 |
| 0486244 | 1/1918 | France | 24/663 |
| 0842683 | 6/1939 | France | 24/663 |

*Primary Examiner*—Lloyd A. Gall

*Attorney, Agent, or Firm*—Jose W. Jimenez

[57] ABSTRACT

A push to install, quarter turn to release fastening system includes a fastener having a plurality of radially extending frustum-shaped projections spaced along a shank and a pair of diametrically opposed ribs extending along the shank forming smooth surfaces outside the periphery of the frustum-shaped projections. The receptacle includes a split cylinder forming a pair of spring latches that are displaced to permit entry and captivation of the fastener. When the fastener is turned 90°, the ribs displace the spring latches to positions out of engagement with the frustum-shaped projections to enable removal of the fastener from the receptacle.

4 Claims, 3 Drawing Sheets

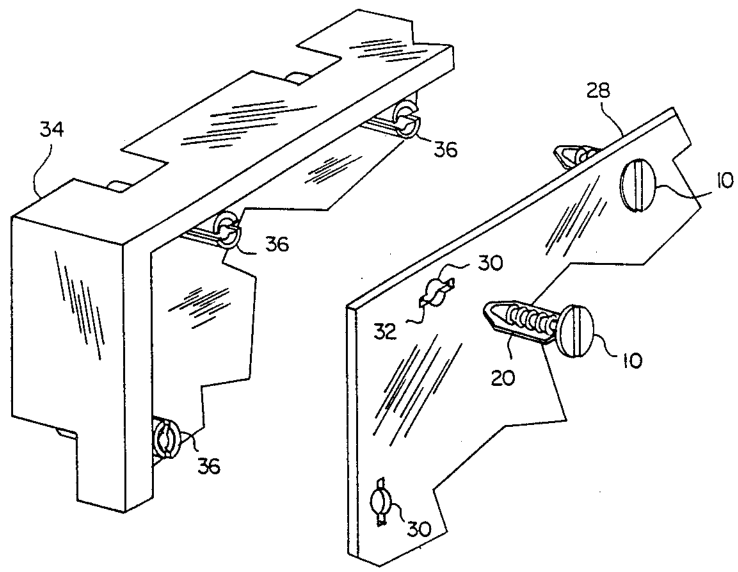
FIG. 10
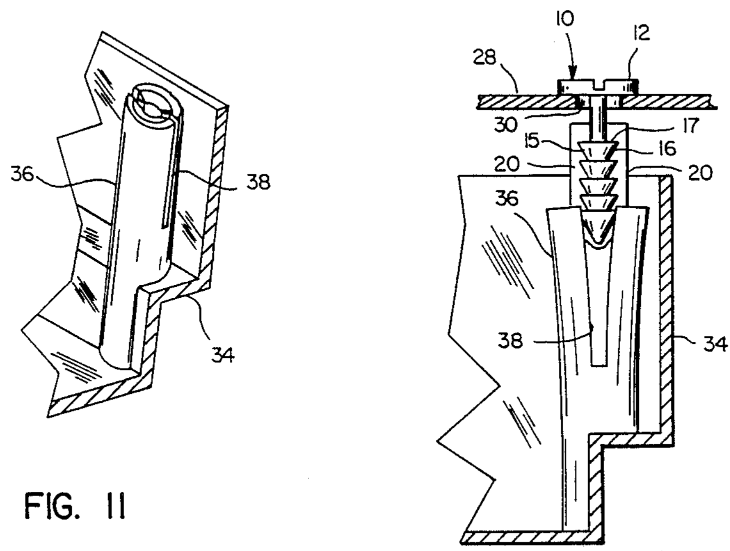
FIG. 11
FIG. 12

QUICK INSTALL AND RELEASE FASTENING SYSTEM

BACKGROUND OF THE INVENTION AND PRIOR ART

This invention relates generally to fastening systems and specifically to a push to install, quarter turn to release fastening system for installing panel boards and the like to cabinets.

The design of the fastening system of the invention lends itself to molding techniques to achieve the benefits of very low cost, rapid, secure installation and quick release, should that be desired. While the inventive fastening system should not be restricted as to material, the preferred embodiment utilizes plastic. As will be seen from the following description, the receptacle means of the fastening system may either be molded integrally with a cabinet or housing or constructed as a separate article. The fastener lends itself to a captivated design where it is held to the panel or other element that is to be fastened to the receptacle means. In accordance with the invention, the fastener is installed by pushing or driving it into engagement with the receptacle. The fastener includes a slotted head that is engageable by a screwdriver for enabling removal from the receptacle by a quarter turn of the fastener.

OBJECTS OF THE INVENTION

A principal object of the invention is to provide a novel fastening system.

Another object of the invention is to provide a push to engage, turn to release fastening system of improved construction.

A further object of the invention is to provide a quick install and release fastening system that lends itself to molding techniques.

BRIEF DESCRIPTION OF THE DRAWINGS

These and other objects and advantages of the invention will become apparent upon reading the following description in conjunction with the drawings, in which:

FIG. 10 is a partial exploded view illustrating fastening system of the invention during installation of a panel to a cabinet;

FIG. 11 is a partial sectional view of the cabinet of FIG. 10 showing an integrally molded receptacle; and FIG. 12 is a partial sectional view showing installation of the panel to the cabinet of FIG. 10.

DESCRIPTION OF THE PREFERRED EMBODIMENT

Figure 1:
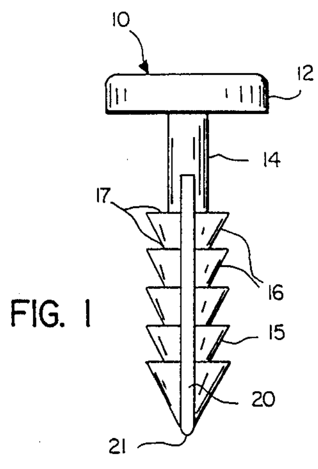
FIG. 1 is a fastener constructed in accordance with the invention.
Figure 2:
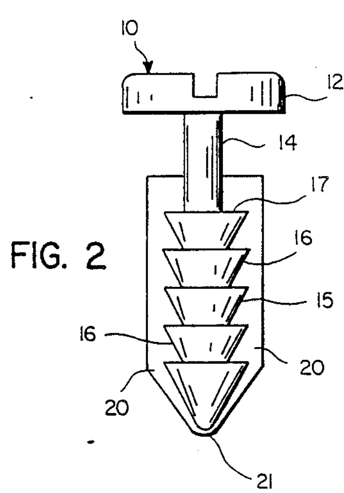
FIG. 2 is a side view of the fastener of FIG. 1.

Referring to FIGS. 1 and 2, a fastener 10 includes a large circular head 12 at one end of a generally cylindrical shank 14, along the length of which are formed a series of radially extending frustum shaped projections 16 having tapered portions 15 and flat portions 17. A pair of elongated ribs 20 extend on opposite sides of shank 14 and bifurcate the series of projections 16 and provide a pair of narrow smooth opposed surfaces that extend beyond the periphery of the frustum shaped projections 16. As will be seen, the pair of ribs 20 enable fastener 10 to be readily removed from a receptacle 22. Ribs 20 follow the taper 15 of the frustum-shaped projections 16 of fastener 10 as shown at 21 to assist entry of the fastener into a receptacle.

Figure 5:
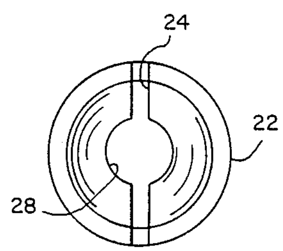
FIG. 5 is a top view of the receptacle of FIG. 3.
Figure 3:
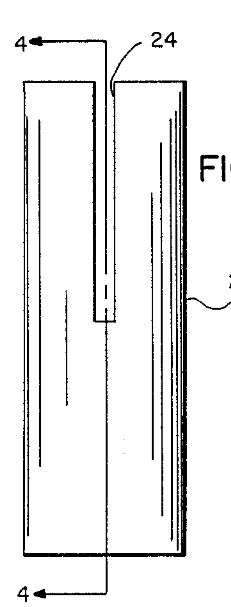
FIG. 3 is a receptacle constructed in accordance with the invention.
Figure 4:
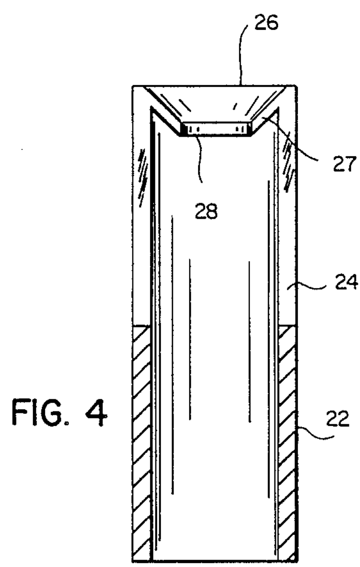
FIG. 4 is a sectional view of the receptacle of FIG. 3 taken along the line 4—4.

FIGS. 3, 4 and 5 are views of a form of receptacle 22 that may be used with the fastener of FIGS. 1 and 2 to form the fastening system of the invention. The receptacle comprises a generally cylindrical body that includes a pair of diametrically opposed slots 24 that extend along the length of the body 22 a distance that is primarily determined by the amount of force required for insertion and pull out of the fastener. As shown, with a fastener molded from resin material available from DuPont under the trademark Zytel FR-50 and the receptacle resin material from General Electric Company under the trademark Noryl FN-190, the system will withstand a pull out force of 100 pounds. The spacing between the frustum-shaped projections 16 and the number of such projections may be varied to suit particular system requirements. The receptacle includes a tapered entry 26 that terminates in an orifice 28 of smaller diameter than the diameter of frustum shaped projections 16. Tapered entry 26 assists in installation of fastener 10 by cooperating with the tapered undersides 15 of frustum-shaped projections 16.

Figure 6:
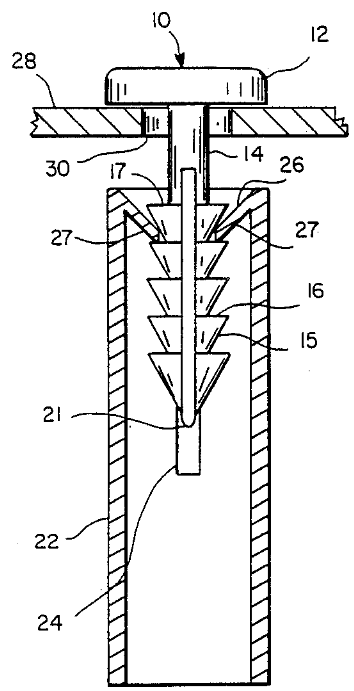
FIG. 6 is a sectional view of the fastener being installed is a receptacle.
Figure 7:
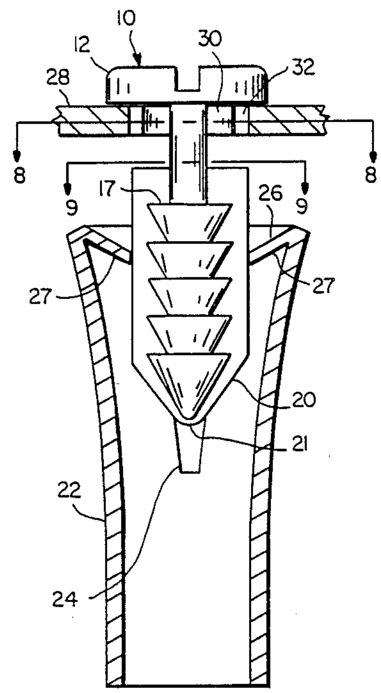
FIG. 7 is a sectional view of the fastener of FIG. 6 being removed from a receptacle.

As seen in FIGS. 6 and 7, bifurcating part of body 22 makes the pair of split walls resilient. The walls are displaced radially by tapered undersides 15 of projections 16 as fastener 10 is pushed into receptacle 22. Ribs 20 and tapered end 21 on fastener 10 cooperate with slots 24 in receptacle 22 to guide fastener 10 into position. As will be seen below, slots may also be provided in a panel that are in alignment with the receptacle slot for guiding the fastener. As the tapered undersides 15 of frustum-shaped projections 16 engage tapered entry 26, the upper halves of body 22 are deflected outwardly. When a frustum-shaped projection 16 has passed beyond the distended entry of the receptacle, the wall portions spring back in an attempt to return to their original positions, and in so doing, the undersides 27 of the entry 26 slip onto flat portions 17 and form latches that captivate the fastener. As shown in FIG. 6, spring latches 27 fit between adjacent frustum shaped projections 16 and prevent removal of fastener 10 from the receptacle. It will be apparent that as fastener 10 is driven more deeply into receptacle 22, that spring latches 27 are successively "opened" and "closed" by passage of the tapered portion 15 of each frustum shaped projection 16, in a ratcheting fashion.

In FIG. 7, fastener 10 has been given a one quarter turn (90° rotation) and ribs 20 laterally displace spring latches 27 which now ride along the smooth surfaces of ribs 20. Thus the spring latches are moved to a position out of engagement with the flat portions 17 of frustum shaped projections 16 and fastener 10 may now be readily removed from receptacle 22.

Figure 9:
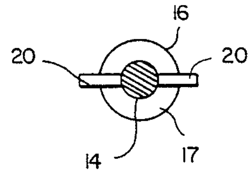
FIG. 9 is a view taken along the line 9—9 of FIG. 7.
Figure 8:
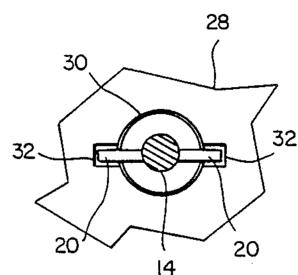
FIG. 8 is a partial view taken along the line 8—8 of FIG. 7.

In many installations, it is desirable to captivate the fasteners to the panel board or the like for convenience in installation and removal. This is readily accomplished as illustrated in FIGS. 8 and 9 by forming a pair of diametrically opposed notches 32 in the circumference of aperture 30 in panel 28. Notches 32 cooperate with ribs 20 on fastener 10 to permit passage of the frustum shaped projections 16 of fastener 10 through aperture 30 only when ribs 20 are aligned with notches 32. Head 12 is of course larger in diameter than hole 30, and consequently, fastener 10 is captivated to the panel 28, although it can be removed by proper manipulation.

In FIG. 10, a partial illustration of a molded plastic cabinet 34 with an integrally molded receptacle means 36 is shown with a panel 28 having corresponding apertures 30 with diametrical notches 32. Two fasteners 10 are illustrated, one being captivated to panel 28 and the other shown in position for entry into its corresponding aperture 30 in panel 28. It will be appreciated that the notches around the apertures in the panel may be formed to align with the bifurcated walls of the corresponding receptacles in the cabinet, as mentioned above, and be used to align the ribs of the fasteners with the split entry of the receptacles to simplify installation, as well as to captivate the fastener to the panel.

In FIG. 11, a partial cutaway sectional view illustrates the general arrangement of receptacles 36 with respect to a cabinet 34. FIG. 12 is a view showing the fastener 10 captivated to panel 28 and being in position to be removed from a receptacle 36. Note that slot 38 is upwardly tapered and indicates that the bifurcated walls of receptacle 36 are distended.

It will of course be appreciated by those skilled in the art that the spring latches 27 need not be positioned adjacent to the entry of the receptacle. Depending upon the particular molding requirements, they may be positioned at the bottom of the receptacle with the entry being clear. Such modifications will be seen to be well within the ordinary skill of one in the art and should be understood to be included in the invention even though not specifically illustrated. The invention is to be limited only as defined in the claims.

What is claimed is:

1. In combination:

a cabinet having a plurality of integrally formed cylindrical receptacles each including a smooth bifurcated tapered entry section forming a pair of opposed spring latches;

a panel having a plurality of apertures in alignment with said receptacles;

a plurality of fastener means for securing said panel to said cabinet, each said fastener means comprising:

a drive head and a shank;

at least one radially extending frustum-shaped projection on said shank having a tapered portion and a flat portion;

a pair of ribs on opposite sides of said shank, said ribs forming two smooth surfaces extending outside the periphery of said frustum-shaped projection and terminating in a tapered end;

said tapered end and said smooth tapered entry cooperating to guide said shank into said receptacle, said tapered portion of said frustum-shaped projection readily displacing said spring latches during insertion of said fastener means and said flat portion of said frustum-shaped projection cooperating with said spring latches to secure said fastener means; and said ribs displacing said spring latches to a position out of engagement with said flat portion when said shank is rotated through substantially 90° to permit removal of said fastener means from said receptacle.

2. The combination of claim 1 wherein said apertures are sized to pass said frustum-shaped projections but not said ribs, and further including pairs of opposed notches formed in said panel adjacent the sides of said apertures for permitting passage of said ribs.

3. The combination of claim 2 wherein said pairs of opposed notches are aligned with slots in corresponding ones of said receptacles to permit entry of said ribs.

4. A fastening system comprising:

a fastener including a drive head and a cylindrical shank;

a series of radially extending, generally frustum-shaped projections spaced along said shank;

two diametrically opposed ribs extending the length of said projections and forming two smooth surfaces bridging said frustum-shaped projections and terminating in a tapered end;

a cylindrically shaped receptacles including a bifurcated smooth, tapered entry section forming a pair of diametrically opposed spring latches for engaging said projections and securing said fastener in said receptable, said smooth tapered entry section cooperating with said tapered end to guide said shank into said receptacle; and said ribs displacing said spring latches out of engagement with said projections when said shank is rotated substantially 90° to permit removal of said fastener from said receptacle.

* * * * *